(12) United States Patent
Baumgarten et al.

(10) Patent No.: US 10,448,569 B2
(45) Date of Patent: Oct. 22, 2019

(54) METHOD AND APPARATUS FOR OPERATING A COMBINE HARVESTER

(71) Applicant: CLAAS Selbstfahrende Emtemaschinen Gmbh, Harsewinkel (DE)

(72) Inventors: Joachim Baumgarten, Beelen (DE); Christoph Bussmann, Harsewinkel (DE); Christoph Heitmann, Warendorf (DE); Sebastian Neu, Bad Laer (DE); Stefan Terörde, Warendorf (DE); Henner Vöcking, Rietberg (DE); Scott Wellensiek, Harsewinkel (DE); Andreas Wilken, Bissendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 132 days.

(21) Appl. No.: 15/376,045

(22) Filed: Dec. 12, 2016

(65) Prior Publication Data

US 2017/0188515 A1 Jul. 6, 2017

(30) Foreign Application Priority Data

Dec. 18, 2015 (DE) .................. 10 2015 122 269

(51) Int. Cl.
*A01D 41/127* (2006.01)
*C12C 7/01* (2006.01)
(Continued)

(52) U.S. Cl.
CPC ............ *A01D 41/1276* (2013.01); *C12C 7/01* (2013.01); *C12C 7/165* (2013.01); *C12C 7/17* (2013.01); *C12C 7/205* (2013.01); *C12C 7/24* (2013.01)

(58) Field of Classification Search
None
See application file for complete search history.

(56) References Cited

U.S. PATENT DOCUMENTS 4,527,241 A * 7/1985 Sheehan ............. A01D 41/127
56/10.2 R
6,863,604 B2 3/2005 Behnke
(Continued)

FOREIGN PATENT DOCUMENTS

DE 10 2013 106 131 A1 6/2014
EP 2687924 A2 1/2014
(Continued)

OTHER PUBLICATIONS

European Search Report for EP Application No. 16190556, dated May 11, 2017.

*Primary Examiner* — Nicholas K Wiltey
(74) *Attorney, Agent, or Firm* — Lempia Summerfield Katz LLC

(57) ABSTRACT

This disclosure relates to a method and device for the operation of a combine harvester with multiple work elements for harvesting a crop via a driver assistance system. In one example implementation, a method for operating such a combine harvester includes determining separately a harvest setting for the crop and a machine configuration of the combine harvester, preselecting a process control strategy among a plurality of process control strategies based on the harvest setting and machine configuration wherein each of the plurality of process control strategies is aimed at fulfillment of at least one harvesting quality criterion stored in the memory of the combine harvester, and automatically determining at least one machine parameter for the work elements of the combine harvester according to the preselected process control strategy and controlling the work (Continued)

elements corresponding to the at least one machine parameter.

21 Claims, 3 Drawing Sheets

(51) Int. Cl.
*C12C 7/165* (2006.01)
*C12C 7/17* (2006.01)
*C12C 7/20* (2006.01)
*C12C 7/24* (2006.01)

(56) References Cited

U.S. PATENT DOCUMENTS

| | | |
|---|---|---|
| 8,935,060 B2 | 1/2015 | Baumgarten et al. |
| 9,002,594 B2 | 4/2015 | Wilken et al. |
| 2003/0216158 A1 | 11/2003 | Bischoff |
| 2005/0137003 A1* | 6/2005 | Behnke .............. A01D 41/1276 460/1 |
| 2008/0261671 A1* | 10/2008 | Stukenholtz ....... A01D 41/1208 460/114 |
| 2010/0217474 A1* | 8/2010 | Baumgarten ........ A01D 41/127 701/31.4 |
| 2014/0019018 A1 | 1/2014 | Baumgarten et al. |
| 2014/0277959 A1* | 9/2014 | Wagers ................ A01C 21/005 701/50 |
| 2014/0277960 A1 | 9/2014 | Blank et al. |
| 2014/0338298 A1* | 11/2014 | Jung ................... A01D 41/127 56/10.2 R |
| 2015/0046043 A1 | 2/2015 | Bollin et al. |

FOREIGN PATENT DOCUMENTS

| | | |
|---|---|---|
| EP | 2837279 A2 | 7/2014 |
| EP | 2781975 A1 | 9/2014 |
| WO | WO2014093814 A1 | 6/2014 |

* cited by examiner

METHOD AND APPARATUS FOR OPERATING A COMBINE HARVESTER

CROSS REFERENCE TO RELATED APPLICATIONS

This application is based upon and claims priority to German Patent Application DE 10 2015 122 269.8, filed on Dec. 18, 2015, the entire content of which is incorporated herein by reference.

TECHNICAL FIELD

The present disclosure generally relates to operation and electronic control of a combine harvester.

BACKGROUND

A combine harvester may be used for harvesting various types of grain crops. For that purpose, a combine harvester may include various work elements designed for processing a crop flow in different harvest processing stages. The combine harvester as a whole and each work element of the combine harvester may further be mechanically configured in various machine constellations or configurations.

DETAILED DESCRIPTION

Figure 1A:
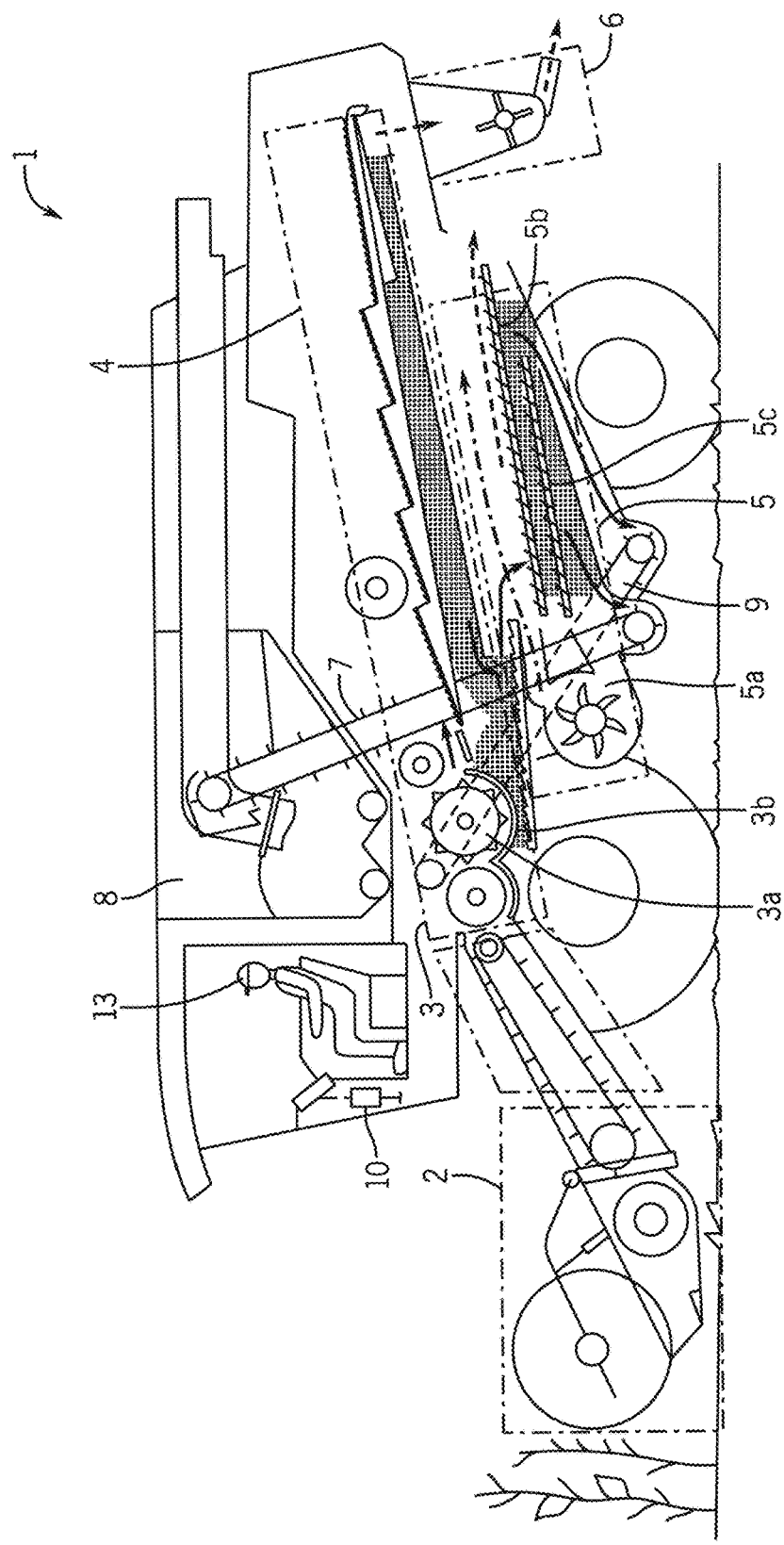
FIG. 1A shows a side view of an example combine harvester.

The invention pertains to a method for the operation of a combine harvester with the features of: determining, by an electronic driver assistance system of the combine harvester, a harvest setting for the crop and a machine configuration of the combine harvester; preselecting, by the electronic driver assistance system, a process control strategy from among a plurality of process control strategies stored in a memory of the electronic driver assistance system of the combine harvester, wherein preselecting is based on the harvest setting and the machine configuration, and wherein each of the plurality of process control strategies is aimed at fulfillment of at least one harvesting quality criterion stored in the memory of the combine harvester; and automatically determining, by the electronic driver assistance system, at least one machine parameter for the work elements of the combine harvester according to the preselected process control strategy and controlling the work elements corresponding to the at least one machine parameter. The invention further pertains to a combine harvester apparatus for the with the features of: a plurality of work elements for harvesting a crop; an electronic driver assistance system comprising a memory (for storing at least one harvesting quality criterion; and a plurality of process control strategies each aimed at fulfillment of the at least one harvesting quality criterion); and a computing device. The computing device is configured to: determine separately a harvest setting for the crop and a machine configuration of the combine harvester; preselect a process control strategy among the plurality of process control strategies based on the harvest setting and machine configuration; automatically determines at least one machine parameter for the plurality of work elements according to the preselected process control strategy; and control the work elements corresponding to the at least one machine parameter.

Combine harvesters serve the function of mowing of grain crops and threshing of grains. The threshing is thereby done through a threshing unit, which separates grains from the crops picked up through a cutting unit, leaving behind chaffs and straws. The separated grain is fed to a grain hopper after a subsequent cleaning. The chaff and the straw, for example, may be either mulched and scattered across the field, or, in case of the straw, laid as swaths for later pickup by a baler. Hereinafter, the term "harvested crop" can be understood as the entire material picked up by the threshing unit, therefore including the seeds that are not separated as grains from the harvested crops by the threshing unit, that may possibly remain in the crop flow of the combine harvester as loss, and that are deposited with the straw.

For threshing corn crops in the threshing unit, the corn is rubbed out of the straw through, for example, a rolling process. The corn grain is threshed out and is separated from the remaining crop flow, so that the separated gain can be directly fed for cleaning. The remaining crop flow is then fed to a separation area, in which the remaining grain can be separated from the crop flow and can then also be fed for cleaning by means of a shaker-type arrangement, for example.

An efficient harvest process can be achieved through the control of operating or work elements of the combine harvester by means of a driver assistance system. Based on a process control strategy, the driver assistance system determines at least one machine parameter of one or more operating elements automatically, whereby the determined machine parameter is specified for the corresponding work element (DE 10 2013 106 131 A1, US Published Application No. 2014/0019018, herein incorporated by reference in its entirety). In this procedure, an automatic change or adjustment of the process control strategy is provided through the driver assistance system, as long as certain predetermined quality criteria are not fulfilled. The efficiency of the harvest process can thereby be improved.

One challenge with the procedure is to ensure high efficiency of the harvest process for different types of crops that require different machine constellations or configurations (used interchangeably) at least for some work elements of the combine harvester.

The problem, discussed in more detail below, is to design and to further improve the procedure so that the efficiency of the harvest process is also increased while threshing different grain types. In one implementation, the above problem is solved with a method in accordance with determining the harvest setting and machine configuration using a driver assistance system and in accordance with preselecting the process control strategy based on the harvest setting and machine configuration. In particular, one implementation comprises that the process control strategy underlying the harvest process is preselected and/or parametrized based on both a harvest setting and the machine configuration. The harvest setting and the machine configuration are first determined using the driver assistance system for this purpose.

The grain type to be threshed may be part of the harvest setting and may be considered in pre-selecting a predefined process control strategy for the combine harvester, on one hand. On the other hand, the process control strategy selection is determined by the predominant machine configuration, which in turn may depend on the harvest setting. The proposed solution by this disclosure ultimately provides an optimal preselection or parametrization of the process control strategy.

In certain embodiments, the process control strategy comprises a control or regulation aimed at the fulfillment of at least one assigned quality criterion (Q), specified based on the harvest setting and the machine configuration. In particular, the control or regulation may further be based on a characteristic diagram, which may be selected from a plurality of characteristic diagrams in accordance with various harvest setting(s) and machine configuration(s).

In one embodiment, a preselection of the process control strategy may be made and the preselected process control strategy may be optimized in the course of the harvest process or may be replaced by another process control strategy (e.g., the harvest process may first be implemented based on the preselected process control strategy, with the process control strategy being optimized in the course of the harvest process or may be replaced by a different process control strategy). The preselected process control strategy may therefore continue to develop in the course of the harvest process.

Another embodiment relates to an automatic preselection of the process control strategy. Specifically, each process control strategy of the plurality of process control strategies is associated with at least one condition concerning the harvest setting and at least one condition concerning the machine configuration. The preselection of the process control strategy involves query on the conditions. The conditions for each process control strategy may be modified readily, so that the preselection of process control strategy may be easily adapted to the changing conditions. In this regard, the preselection of the process control strategy may be performed by the driver assistance system, which may query the conditions stored in the memory, whereby at least one condition concerning the process control strategy and at least one condition concerning the machine configuration is assigned in the memory (such as via a look-up table) and whereby the driver assistance system may only preselect the process control strategy in case of fulfillment of all conditions assigned.

Further embodiments primarily concern the threshing of corn, which places specific demands on both the control strategy or regulation and the machine configuration different from the threshing of other grain types such as "wheat", "barley", "oats", or the like. An automatic determination and specification of machine parameters is provided in the proposed solution, by preselecting and adapting the process control strategy to the harvest setting and to the machine configuration.

Additional embodiments are directed to a combine harvester for performing the methods above.

Figure 1B:
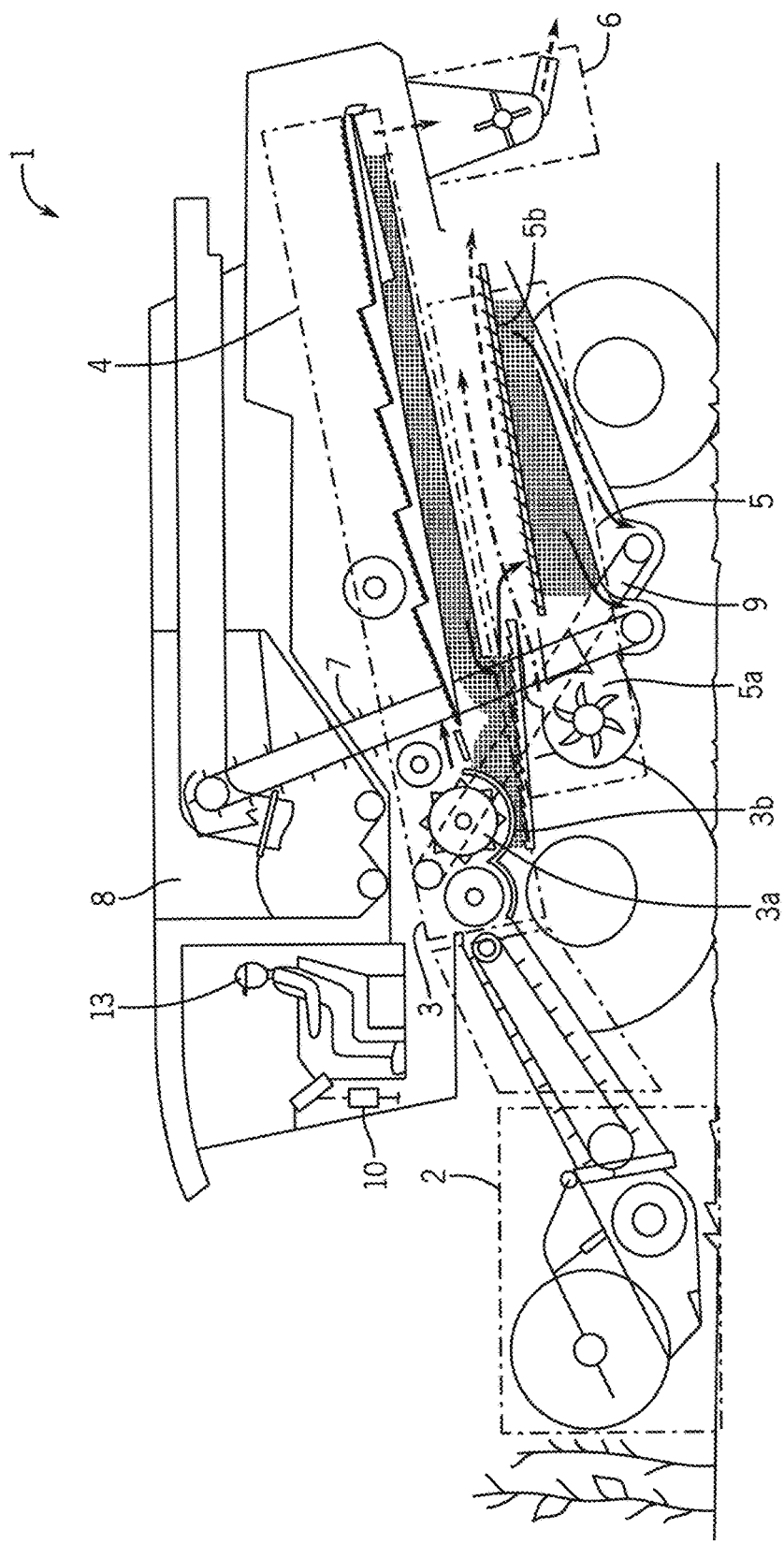
FIG. 1B shows a side view of an example combine harvester without a bottom sieve.
Figure 2:
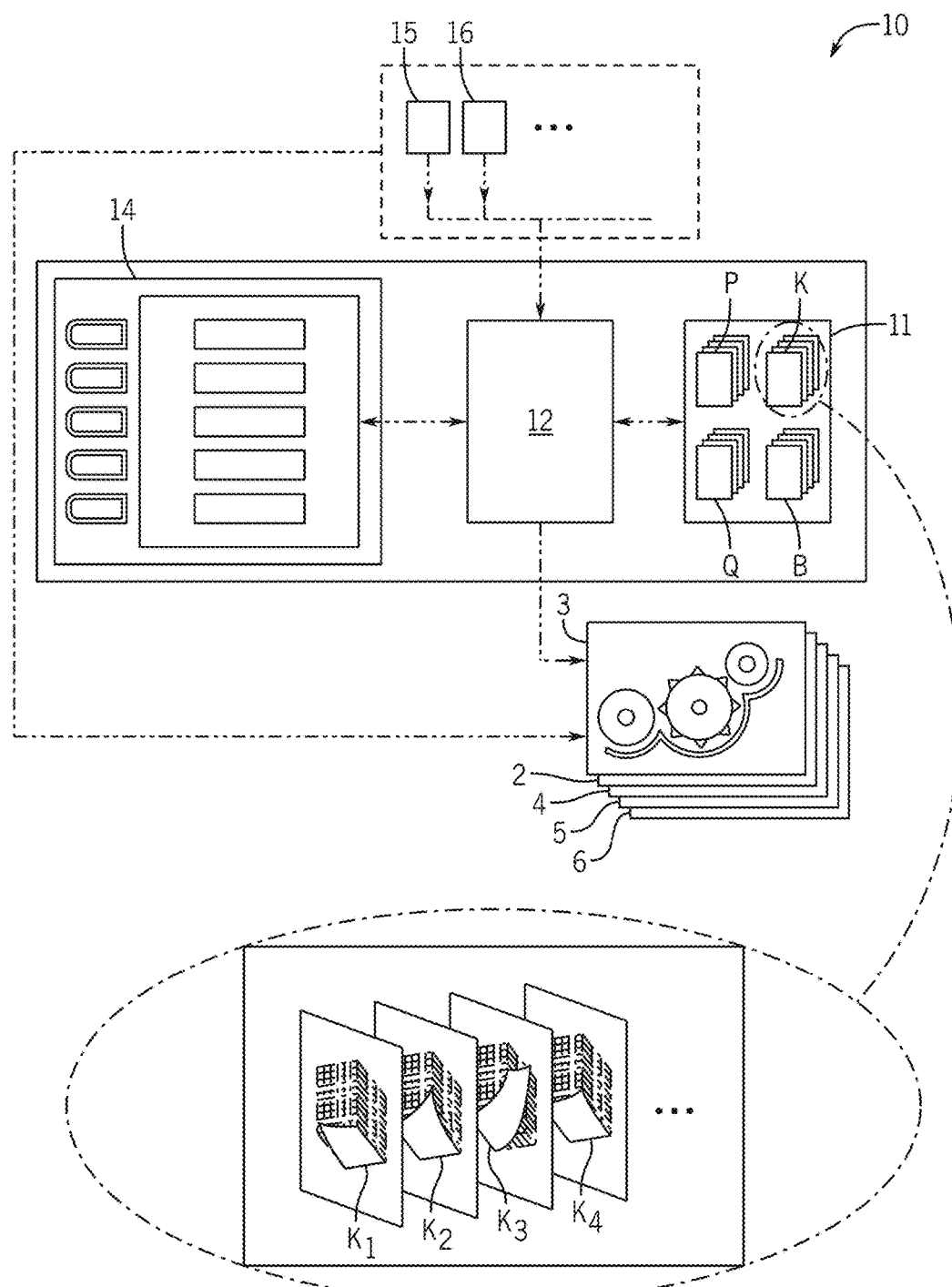
FIG. 2 shows a schematic block diagram of an electronic driver assistance system for controlling the combine harvester of FIGS. 1A-B.

The implementation of various embodiments above is clarified by FIGS. 1A-B and 2. The agricultural machine represented in FIG. 1A is configured as a combine harvester and performs an agricultural harvesting process accordingly. The combine harvester 1 includes a cutting system 2, a threshing unit 3, a separator assembly 4, a cleaning assembly 5, and distribution assembly 6.

While the cutting system 2 serves the function of cutting and the collection of the crops from a crop field, the threshing unit 3 performs the task of threshing the grains from the collected crops. The term "crops" is thus to be understood as the entire material that is collected from the crop field and is fed to the threshing unit 3, whereby the term "grains" describes the grains to be separated and collected from the crops.

The threshing unit 3 is equipped with a threshing drum $3a$ that works together with a threshing concave $3b$. The crop flow that is fed to and then leaves the threshing unit 3 as a mixture of straw and threshed grain is then fed to the separator assembly 4, without the grains being separated and collected from the crop flow.

The threshing unit 3 principally serves to rub a majority of the grain out of the crops through the threshing process. In the separator assembly 4, the straw and grain mixture are then moved or shaken, so that the remaining grain is separated from the straw and the other crop flow as much as possible. The grain separated and collected in the threshing unit 3 and the separator assembly 4 is then fed to the cleaning assembly 5. In the cleaning assembly 5, which is a multistage system, non-grain constituents fed from the threshing unit and mixed with grain constituents, e.g. chaff and straw parts, as well as un-threshed materials, such as a tip of an ear or awns—are separated from the grains. The cleaned grains are then transported to a corn tank 8 through a transport assembly 7, e.g. a corn elevator. The threshed-out straw, i.e., the remaining crops in the separator assembly 4, is laid down by the combine harvester 1 as, a swath along the harvest lane, for example.

The proportion of the crop flow that is neither fed to the transport assembly 8 nor deposited in the above-manner within the cleaning assembly, is fed to a so-called return 9, through which that proportion is fed to the threshing unit 3 again. By means of the cleaning assembly 5 with a cleaning fan $5a$ and a screen assembly comprising a top sieve $5b$ and a bottom sieve $5c$ in particular, part of the crops which pass through the top sieve $5b$ but not the bottom sieve $5c$ and which are too heavy to be blown by the cleaning fan $5a$ in direction of the distribution assembly 6 slide and fall into the return 9. The work elements 2-6 of the combine harvester 1 can usually be controlled through the specification of different machine parameters for the work elements. Using the example of the threshing unit 3, this includes driver parameters depending on the machine configuration. These may include parameters such as a bowl speed or other flow key figures as well as a concave width, i.e., distance between the threshing drum $3a$ and the threshing concave $3b$. If the threshing unit 3 includes deawner flaps as would be accordingly specified in the machine configuration, machine parameters related to the deawner flaps then may also be adjusted as part of the control for the threshing unit 3.

As shown in FIG. 2, the proposed combine harvester 1 further includes an electronic driver assistance system 10 to control the work elements 2-6. This driver assistance system 10 comprises a memory 11 to store data and information and a computing device 12 to process the data stored in the memory 11 and to control the combine harvester. The driver assistance system 10 is principally configured to support a user 13 (of FIG. 1A) of the combine harvester 1 during the operation of the combine harvester 1. The driver assistance system 10 with the memory 11 and the computing device 12 is shown in FIG. 2.

Several process control strategies P are stored in the memory 11 of the driver assistance system 10, each of which are usually designed to fulfill at least one quality criterion Q. It is thereby the function of the driver assistance system 10 to automatically determine at least one machine parameter (to be defined below) of the work elements 2-6 and specifies it for the corresponding work element.

The at least one quality criterion Q mentioned above, for example, may include the adjustment, requirement, and/or optimization of harvest process parameters such as "threshing losses", "broken grain percentage", "layer height", "separation losses", "cleaning losses", "threshing unit strain" or "fuel consumption". Generally speaking, the process control strategy P comprises the specification, according to which the fulfillment of the respective quality criterion is supposed to be achieved. In particular, the process strategy P may include control and regulation guidelines as is explained in further detail below.

Both the harvest setting, particularly the grain type to be harvested (see more explanation below), and the machine configuration may be determined by means of the driver assistance system 10, and a process control strategy may be preselected from the process control strategies stored in the memory 11 based on the determined harvest setting and the determined machine configuration. This principally ensures that the process control strategy is not just geared towards the grain type to be harvested, but also towards the actually existing machine configuration. Optimal process control strategies can thus be very different depending on the mechanical configuration of, for example, the threshing unit, and the design of the threshing concave 3b in particular, in addition to the grain type. The same applies to other work elements 2-6. Another example for this is explained further below by means of the cleaning assembly 5. As indicated above, the preselected process control strategy P comprises control or regulation guidelines aimed at fulfilling the at least one assigned quality criterion. "Control" may comprise the determination of the machine parameters that may be controlled via feedback technologies. It is now preferable that the preselection of the process control strategy having the corresponding control or regulation parameters depends on the control or on the regulation of the harvest setting and of the machine configuration. The preselection of the process control strategies can be the result of a simple parametrization of the control or regulation.

The control or regulation specified for each process control strategy P may preferably be based on at least one characteristic diagram K, whereby the at least one characteristic diagram depends on the harvest setting and the machine configuration. Provision can principally be made for that the characteristic diagrams usually underlying the control or the regulation may differ.

According to the various embodiment of the present disclosure, the process control strategy P is merely preselected initially through the driver assistance system 10. In this case, this preferably means that the harvest process is first implemented based on the initially preselected process control strategy P, and that the preselected process control strategy is then optimized or replaced by a different process control strategy in the course of the harvesting process based on feedback. In effect, the term "preselected" may comprise the initially selected process control strategy being exposed to or experience ongoing changes, based on, for example, feedback.

As mentioned above, the harvest setting pertains to the grain type to be harvested, such as "wheat", "barley", "oats", "corn" or the like. But the harvest setting may also comprise information about or property of the crop, such as the crop density, crop moisture or the like.

In one implementation, the machine configuration comprises the composition of mechanical and/or control-related constituents of at least one of the work elements 2-6. As also already indicated, the machine configuration, by way of example of the threshing unit 3, may comprise the inclusion of the threshing unit with different threshing concaves 3b. It is thereby intended that the machine configuration be dependent on the harvest setting. The harvesting of corn can thus correspond to a machine configuration including the threshing drum 3a and the threshing concave 3b of the threshing assembly, and the sieves 5a and 5b of the cleaning assembly or the like, for example.

Provisions in the process control strategy P can principally be made for defining different machine parameters in dependence of the machine configuration of the work elements 2-6. It is then preferably the case that the driver assistance system 10 determines different machine parameters depending on the machine configuration following the provisions in the process control strategy. In a simple case still to be explained, a machine configuration, in which the bottom sieve 5c of the cleaning assembly is missing or not included (FIG. 1B), the machine parameter "bottom sieve width" may not be considered or included in the process control strategy as, for example, being adjustable. Otherwise, the actual machine configuration without the bottom sieve 5c would deviate from the machine configuration assumed by the process control strategy that includes the bottom sieve 5c, so that the specified quality criteria cannot be always fulfilled as intended.

Different advantageous variants or embodiment are conceivable for the preselection of the process control strategy P using the driver assistance system 10. It is preferable here if the preselection of the process control strategy P is made based on a query of conditions B stored in the memory 11 by the driver assistance system, whereby at least one condition concerning the harvest setting, and at least one condition concerning the machine configuration are assigned to at least one process control strategy P in the memory 11. A process control strategy P is only preselected using the driver assistance system 10 in case all the conditions assigned to that process control strategy are fulfilled. For example, a process control strategy P may be designed for corn harvesting and thus the first condition for preselecting that process control strategy may be that the type of grain to be harvested (as entered manually by the user or detected automatically by sensors 15, see below) must be corn. The second condition for the process control strategy on the machine configuration may require that the threshing concave 3b and the sieves 5b, 5c of the cleaning assembly 5 comprising a suitable width.

The combine harvester 1 disclosed above has the work elements cutting system 2, threshing unit 3, separator assembly 4, and cleaning assembly 5. In accordance with the embodiments above, at least one of the work elements 2-6 can be configured to change the machine configuration. An adjustment of the machine configuration of the combine harvester 1 according to the grain type to be harvested each time is thus possible.

The determination of the harvest setting may take place in different ways. In the simplest case, the harvest setting may be queried from the user using a man-machine interface 14 of the driver assistance system 10. The harvest setting may also be alternatively detected by a front-end sensor 15 that captures the harvest setting, especially the grain type using various sensing technologies. For example, the front-end sensor may be a camera and the camera or the driver assistance system 10 may be equipped with image processing capability for recognizing the grain type from the acquired images.

Determination of the machine configuration may be made in similar ways. For example, the machine configuration may be queried from the user by means of the man-machine interface 14. Alternatively, the machine configuration may be captured by sensors 16 that detect the equipped components for various work elements 2-6.

Here, the cleaning assembly preferably has a cleaning fan 5a, a top sieve 5b, and a bottom sieve 5b as indicated above, whereby the flow rate of the cleaning fan 5a and/or the top sieve width and/or the bottom sieve width may be adjustable machine parameters for the control of the cleaning assembly 5. Other machine parameters assigned to the "cleaning assembly" are also conceivable.

In one example implementation, upon determining the harvest setting of "corn" and the machine configuration of "cleaning assembly with bottom sieve", a process control strategy is selected using the driver assistance system, which comprises an automatic control of the bottom sieve of the cleaning assembly 5. However, if the harvest setting of "corn" and the machine configuration of "cleaning assembly without bottom sieve" is determined, a process control strategy is selected using the driver assistance system 10 that comprises a user-guided rather than automatic control of the bottom sieve of the cleaning assembly 5. This is because the automatic control of the cleaning assembly 5 is based on the determination of a return or feedback parameter, such as return volume and/or the proportion of grain. As return 9 and thus a feedback will not be available without a bottom sieve 5c at all or only available to a small extent, the above return or feedback parameter needed as the basis for the automatic control will be missing or non-representative.

In the event that there is a bottom sieve 5c and the cleaning assembly 5 is automatically controlled as mentioned above, the following measures are possible examples for the adjustment or optimization of the work process parameter "cleaning losses'.

For example, when an increase of the proportion of grain in the return volume above a predefined or predetermined threshold is detected by the driver assistance system, the bottom sieve width is increased by the driver assistance system 10. It can thus be ensured that grains, which erroneously did not pass the bottom sieve 5c, may now pass the bottom sieve 5c.

As another example, in the event that non-grain constituents now increase in a prorated manner, the increase of the flow rate of the cleaning fan 5a may be a suitable automatic control measure.

For another example, the bottom sieve width of the cleaning assembly 5 may be increased and/or the flow rate of the cleaning fan 5a may also be increased when an increase of the return volume is detected.

The above-listed measures for the adjustment or optimization of the harvest process parameter "cleaning losses" are part of the related process control strategy. These measures can form and specify the basis of the control strategy or regulation parameters and/or an addressed core field. Depending on the machine configuration, the process control strategy may be replaced by a different stored process control strategy, which may basically correspond to a parametrization of the process control strategy.

LIST OF REFERENCE LABELS IN THE DRAWINGS

1 Combine harvester
2 Cutting system
3 Threshing unit
3a Threshing drum
3b Threshing concave
4 Separator arrangement
5 Cleaning arrangement
5a Cleaning fan
5b Top sieve
5c Bottom sieve
6 Distribution arrangement
7 Transport arrangement
8 Grain tank
9 Return
10 Driver assistance system
11 Memory
12 Computing device
13 User
14 Man-machine interface
15 Front-end sensor
16 Machine sensor
B Conditions
K Characteristic diagram
P Process control strategies
Q Quality criterion

The invention claimed is:

1. A method for operating a combine harvester having one or more work elements for harvesting a crop, comprising:
determining, by an electronic driver assistance system of the combine harvester, a harvest setting for the crop and a machine configuration of the combine harvester;
preselecting, by the electronic driver assistance system, a process control strategy from among a plurality of process control strategies stored in a memory of the electronic driver assistance system of the combine harvester, wherein the memory of the electronic driver assistance system further includes conditions associated with each of the plurality of process control strategies comprising at least one condition concerning the harvest setting and at least one condition concerning the machine configuration, wherein preselecting is based on the harvest setting and the machine configuration, wherein the preselection of the process control strategy comprises querying the conditions and preselecting the process control strategy only when the process control strategy fulfills at least both of the at least one condition concerning the harvest setting and the at least one condition concerning the machine configuration, and wherein each of the plurality of process control strategies is aimed at fulfillment of at least one harvesting quality criterion stored in the memory of the combine harvester; and
automatically determining, by the electronic driver assistance system, at least one machine parameter for the one or more work elements of the combine harvester according to the preselected process control strategy and controlling the one or more work elements corresponding to the at least one machine parameter,
wherein the harvest settings comprise at least a first grain type and a second grain type;
wherein the machine configurations comprises at least a first machine configuration and a second machine configuration;
wherein the plurality of process control strategies comprise at least four process control strategies each having a respective grain type condition selected from at least the first grain type and the second grain type and a respective machine configuration condition selected from at least the first machine configuration and the second machine configuration; and
wherein the preselected process control strategy is preselected from the at least the four process control strategies, the preselected process control strategy fulfilling at least predefined requirements of the respective grain type condition and the respective machine configuration condition.

2. The method of claim 1, wherein the preselected process control strategy comprises control strategy or regulation aimed at fulfillment of the at least one harvesting quality criterion;
   wherein the control strategy or regulation is based on at least one characteristic diagram; and
   wherein the at least one characteristic diagram depends on the at least one condition concerning the harvest setting and on the at least one condition concerning the machine configuration.

3. The method of claim 1, wherein the one or more work elements of the combine harvester comprise a cutting system, a threshing unit, a separator assembly, and a cleaning assembly, and that at least one of the one or more work elements comprises multiple configurations corresponding to multiple possible machine configurations for the combine harvester.

4. The method of claim 3, wherein the cleaning assembly comprises a cleaning fan, a top sieve and a bottom sieve and wherein a flow rate of the cleaning assembly, a top sieve width, or a bottom sieve width is adjustable for controlling the cleaning assembly.

5. The method of claim 3, wherein the harvest setting indicates that the crop is "corn";
   wherein the machine configuration indicates that the cleaning assembly comprises a cleaning fan and a bottom sieve; and
   wherein the preselected process control strategy comprises an automatic control of the cleaning assembly by the electronic driver assistance system.

6. The method of claim 5, wherein the automatic control of the cleaning assembly is performed based on feedback of return parameters comprising at least one of a return volume or a grain proportion in the return volume.

7. The method of claim 6, wherein the automatic control of the cleaning assembly increases a width of the bottom sieve when an increase of the grain proportion in the return volume above a predetermined threshold is determined by the electronic driver assistance system; and
   wherein the automatic control of the cleaning assembly increases a width of the bottom sieve and increases a flow of the cleaning fan when an increase of return volume over a predetermined threshold is determined by the electronic driver assistance system.

8. The method of claim 1,
   wherein each of a first process control strategy, a second process control strategy, a third process control strategy, and a fourth process control strategy include the respective grain type condition and the respective machine configuration condition;
   wherein the first process control strategy comprises the first grain type as the respective grain type condition and the first machine configuration as the respective machine configuration condition;
   wherein the second process control strategy comprises the first grain type as the respective grain type condition and the second machine configuration as the respective machine configuration condition;
   wherein the third process control strategy comprises the second grain type as the respective grain type condition and the first machine configuration as the respective machine configuration condition;
   wherein the fourth process control strategy comprises the second grain type as the respective grain type condition and the second machine configuration as the respective machine configuration condition;
   wherein preselecting the process control strategy from among the plurality of process control strategies comprises:
      preselecting the first process control strategy only if both the grain type is the first grain type and the machine configuration is the first machine configuration;
      preselecting the second process control strategy only if both the grain type is the first grain type and the machine configuration is the second machine configuration;
      preselecting the third process control strategy only if both the grain type is the second grain type and the machine configuration is the first machine configuration; and
      preselecting the fourth process control strategy only both if the grain type is the second grain type and the machine configuration is the second machine configuration.

9. The method of claim 8, wherein the combine harvester includes a first work element and a second work element;
   wherein the first machine configuration comprises a configuration of the first work element; and
   wherein the second machine configuration comprises a configuration of the second work element.

10. The method of claim 8, wherein the combine harvester includes a work element;
   wherein the first machine configuration comprises a first configuration of the work element; and
   wherein the second machine configuration comprises a second configuration of the work element.

11. The method of claim 10, wherein the work element in the first configuration includes a part;
   wherein the work element in the second configuration does not include the part;
   wherein the first process control strategy and the third process control strategy are automatic control strategies; and
   wherein the second process control strategy and the fourth process control strategy are user-guide control strategies.

12. The method of claim 11, wherein the work element comprises a cleaning assembly;
   wherein the part comprises a bottom sieve;
   wherein the first configuration comprises the cleaning assembly with the bottom sieve;
   wherein the second configuration comprises the cleaning assembly without the bottom sieve;
   wherein the first process control strategy and the third process control strategy automatically control a width of the bottom sieve; and
   wherein the second process control strategy and the fourth process control strategy comprise user guidance for controlling the cleaning assembly.

13. The method of claim 1, wherein preselecting the process control strategy comprises preselecting an initial process control strategy for implementation in a harvest process; and
   responsive to implementing the initial process control strategy to control the work elements in the harvest process, optimizing the initial process control strategy for implementation in the harvest process.

14. The method of claim 1, wherein preselecting the process control strategy comprises preselecting an initial process control strategy for implementation in a harvest process; and responsive to implementing the initial process control strategy to control the work elements in the harvest process, replacing the initial process control strategy with a different process control strategy for implementation in the harvest process.

15. A combine harvester comprising:
one or more work elements for harvesting a crop;
an electronic driver assistance system comprising a memory configured to store:
  at least one harvesting quality criterion;
  a plurality of process control strategies each aimed at fulfillment of the at least one harvesting quality criterion;
  conditions associated with each of the plurality of process control strategies comprising at least one condition concerning a harvest setting and at least one condition concerning a machine configuration; and
a computing device in communication with the electronic driver assistance system and configured to:
  determine separately a harvest setting for the crop and a machine configuration of the combine harvester, wherein the harvest settings comprise at least a first grain type and a second grain type, wherein the machine configurations comprises at least a first machine configuration and a second machine configuration;
  preselect a process control strategy among the plurality of process control strategies based on the determined harvest setting and the determined machine configuration only when the process control strategy fulfills at least both of the at least one condition concerning the harvest setting and the at least one condition concerning the machine configuration, wherein the plurality of process control strategies comprise at least four process control strategies each having a respective grain type condition selected from at least the first grain type and the second grain type and a respective machine configuration condition selected from at least the first machine configuration and the second machine configuration, wherein the preselected process control strategy is preselected from the at least the four process control strategies, the preselected process control strategy fulfilling at least predefined requirements of the respective grain type condition and the respective machine configuration condition;
  automatically determine at least one machine parameter for the one or more work elements according to the preselected process control strategy; and
  control the one or more work elements corresponding to the at least one machine parameter.

16. The combine harvester of claim 15, wherein the combine harvester is first operated based on the preselected process control strategy, and that the preselected process control strategy is further optimized or is replaced by a different process control strategy in operating the combine harvester; and
  wherein the machine configuration specifies mechanical or control components of at least one work element; and
  wherein the machine configuration is to be configured depending on the determined harvest setting.

17. The combine harvester of claim 15, wherein the one or more work elements of the combine harvester comprise a cutting system, a threshing unit, a separator assembly, and a cleaning assembly;
  wherein at least one of the one or more work elements comprises multiple configurations corresponding to a plurality of possible machine configurations for the combine harvester;
  wherein the memory is further configured to store conditions comprising at least one condition concerning the harvest setting and one condition concerning the machine configuration; and
  wherein the computing device is configured to preselect the process control strategy by querying the conditions and preselecting the process control strategy only when the process control strategy fulfills the conditions.

18. The combine harvester of claim 15,
  wherein each of a first process control strategy, a second process control strategy, a third process control strategy, and a fourth process control strategy include the respective grain type condition and the respective machine configuration condition;
  wherein the first process control strategy comprises the first grain type as the respective grain type condition and the first machine configuration as the respective machine configuration condition;
  wherein the second process control strategy comprises the first grain type as the respective grain type condition and the second machine configuration as the respective machine configuration condition;
  wherein the third process control strategy comprises the second grain type as the respective grain type condition and the first machine configuration as the respective machine configuration condition;
  wherein the fourth process control strategy comprises the second grain type as the respective grain type condition and the second machine configuration as the respective machine configuration condition;
  wherein the computing device is configured to preselect the process control strategy from among the plurality of process control strategies comprises by:
    preselecting the first process control strategy only if both the grain type is the first grain type and the machine configuration is the first machine configuration;
    preselecting the second process control strategy only if both the grain type is the first grain type and the machine configuration is the second machine configuration;
    preselecting the third process control strategy only if both the grain type is the second grain type and the machine configuration is the first machine configuration; and
    preselecting the fourth process control strategy only if both the grain type is the second grain type and the machine configuration is the second machine configuration.

19. The combine harvester of claim 18, wherein the combine harvester includes a first work element and a second work element;
  wherein the first machine configuration comprises a configuration of the first work element; and
  wherein the second machine configuration comprises a configuration of the second work element.

20. The combine harvester of claim 18, wherein the combine harvester includes a work element;
  wherein the first machine configuration comprises a first configuration of the work element; and
  wherein the second machine configuration comprises a second configuration of the work element.

21. The combine harvester of claim 20, wherein the work element in the first configuration includes a part;
- wherein the work element in the second configuration does not include the part;
- wherein the first process control strategy and the third process control strategy are automatic control strategies; and
- wherein the second process control strategy and the fourth process control strategy are user-guide control strategies.

\* \* \* \* \*